United States Patent
Drings

(10) Patent No.: US 10,355,261 B2
(45) Date of Patent: Jul. 16, 2019

(54) CELL COIL FOR A LITHIUM-ION ACCUMULATOR

(71) Applicant: Robert Bosch GmbH, Stuttgart (DE)

(72) Inventor: Harald Drings, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/544,589

(22) PCT Filed: Jan. 12, 2016

(86) PCT No.: PCT/EP2016/050415
§ 371 (c)(1),
(2) Date: Jul. 19, 2017

(87) PCT Pub. No.: WO2016/116322
PCT Pub. Date: Jul. 28, 2016

(65) Prior Publication Data
US 2018/0013120 A1 Jan. 11, 2018

(30) Foreign Application Priority Data
Jan. 21, 2015 (DE) .................. 10 2015 200 921

(51) Int. Cl.
*H01M 2/20* (2006.01)
*H01M 2/26* (2006.01)
(Continued)

(52) U.S. Cl.
CPC ......... *H01M 2/206* (2013.01); *H01M 2/0277* (2013.01); *H01M 2/26* (2013.01);
(Continued)

(58) Field of Classification Search
CPC .......... H01M 2/206; H01M 2/26; H01M 2/34; H01M 10/0587; H01M 10/0525; H01M 10/0431
See application file for complete search history.

(56) References Cited

U.S. PATENT DOCUMENTS

2009/0305121 A1* 12/2009 Yoon ................. H01M 10/0431
429/94
2010/0079108 A1* 4/2010 Monden ............... H01M 10/48
320/116
(Continued)

FOREIGN PATENT DOCUMENTS

CN         101485032 A      7/2009
DE         102010049611     6/2011
(Continued)

OTHER PUBLICATIONS

International Search Report for Application No. PCT/EP2015/050415 dated Apr. 13, 2015 (English Translation, 3 pages).

*Primary Examiner* — Osei K Amponsah
(74) *Attorney, Agent, or Firm* — Michael Best & Friedrich LLP

(57) ABSTRACT

The invention relates to a cell coil (30, 40, 50, 60, 100, 200) for a lithium-ion battery, comprising at least two sub-cells (10, 32, 42, 44, 52, 54, 68, 70, 80, 82), which are wound in a space-saving manner and are thermally coupled to each other. According to the invention, the at least two sub-cells (10, 32, 42, 44, 52, 54, 68, 70, 80, 82) are electrically connected in parallel in normal operation, and, in the event of a fault, in particular in the event of an internal short circuit in at least one defective sub-cell (10, 32, 42, 44, 52, 54, 68, 70, 80, 82), at least one defective sub-cell (10, 32, 42, 44, 52, 54, 68, 70, 80, 82) can be electrically separated from the at least one intact sub-cell (10, 32, 42, 44, 52, 54, 68, 70, 80, 82). Because of the at least one defective sub-cell (10, 32, 42, 44, 52, 54, 68, 70, 80, 82) that can be immediately electrically separated from the intact sub-cells (10, 32, 42, 44, 52, 54, 68, 70, 80, 82) by means of an electronic monitoring device (36) in the "event of a fault", a high level of robustness of the cell coil (30, 40, 50, 60, 100, 200) in respect of internal short circuits is achieved. Among other (Continued)

things, the intact sub-cells (10, 32, 42, 44, 52, 54, 68, 70, 80, 82) act, because of the thermal coupling between the sub-cells (10, 32, 42, 44, 52, 54, 68, 70, 80, 82), as a damage-reducing heat sink for the waste heat that is released during the fast discharge of the affected defective sub-cell (10, 32, 42, 44, 52, 54, 68, 70, 80, 82) generally occurring in the event of a short circuit.

14 Claims, 4 Drawing Sheets

(51) Int. Cl.
*H01M 10/04* (2006.01)
*H01M 2/34* (2006.01)
*H01M 10/0587* (2010.01)
*H01M 10/0525* (2010.01)
*H01M 2/02* (2006.01)
*H01M 10/052* (2010.01)

(52) U.S. Cl.
CPC ............. *H01M 2/263* (2013.01); *H01M 2/34* (2013.01); *H01M 10/0431* (2013.01); *H01M 10/0445* (2013.01); *H01M 10/052* (2013.01); *H01M 10/0525* (2013.01); *H01M 10/0587* (2013.01); *H01M 2200/00* (2013.01); *Y02T 10/7011* (2013.01)

(56) References Cited

U.S. PATENT DOCUMENTS

| | | | |
|---|---|---|---|
| 2013/0089759 A1* | 4/2013 | Han | H01M 2/0408 |
| | | | 429/61 |
| 2014/0120395 A1 | 5/2014 | Ziegler | |
| 2014/0242856 A1 | 8/2014 | Kim | |

FOREIGN PATENT DOCUMENTS

| | | |
|---|---|---|
| DE | 102011017613 | 10/2012 |
| DE | 102011110876 | 2/2013 |
| DE | 102011089665 | 6/2013 |
| DE | 102013218248 | 3/2015 |
| JP | H09266013 A | 10/1997 |
| JP | 2984339 | 11/1999 |
| JP | 2003346877 A | 12/2003 |

* cited by examiner

CELL COIL FOR A LITHIUM-ION ACCUMULATOR

BACKGROUND OF THE INVENTION

The invention relates to a cell coil for a lithium-ion accumulator having at least two sub-cells which are wound in a space-saving fashion and thermally coupled to one another.

It is apparent that in future new battery systems or accumulator systems which will have to fulfill very stringent requirements in terms of reliability, safety, efficiency and service life will be used in stationary applications, for example in wind turbines, in motor vehicles which are configured as hybrid vehicles or electric vehicles as well as in electrical appliances.

Owing to their high energy density, in particular lithium-ion accumulators are used as energy stores for electrically driven motor vehicles.

DE 10 2011 017 613 A1 discloses a cell coil for a lithium-ion accumulator. The cell coil comprises two current conductors which are wound to form the cell coil with the intermediate positioning of two separators.

DE 10 2011 110 876 A1 discloses an energy storage device. The energy storage device comprises, inter alia, an energy storage cell, for example in the form of an electrode coil, and a container for holding the energy storage cell. So that the function of the energy storage cell can be reliably ensured, a thermally conductive layer, by which heat can be carried away from the energy storage cell in the direction of the container wall, is provided between the electrode coil and the container wall. In one preferred configuration there is provision that the thermally conductive layer has a partial layer composed of an electrically insulating material. The partial layer ensures, on the one hand, that released heat can flow away satisfactorily from the cell, and on the other hand the partial layer prevents an outer side of the cell from coming into electrical contact with the container wall. Furthermore, the partial layer ensures that in the case of punctiform penetration by a foreign body from the outside short-circuits between the individual electrodes are avoided.

It is disadvantageous, inter alia, that in the case of a fault, in particular in the case of an internal short-circuit of a cell or the like, the energy storage cell does not have any individual cells which can be switched off selectively in order to limit damage.

The probability of the occurrence of internal short-circuits in lithium-ion accumulators can be reduced e.g. by enhanced quality measures during production. However, in this context, all faults cannot be detected and eliminated continuously at an acceptable level of expenditure. Moreover, it is possible to make lithium-ion accumulators mechanically more robust, with the result that external effects, in particular mechanical and thermal effects cannot so easily cause an internal short-circuit. The relatively large material thicknesses which are generally necessary for this purpose and the additional mechanical protective components also have the effect of increasing costs and additionally reduce the volume portion and weight portion of the overall weight which is made up by the active material, and in association with this the electrical energy density of the accumulator. Furthermore, the tendency of lithium-ion accumulators to short circuit can be positively influenced by the selection of other active materials for the electrocoating and/or the use of less active material on the electrodes. However, in this case a reduction in the available capacity of the lithium-ion accumulator also occurs.

SUMMARY OF THE INVENTION

An object of the invention is therefore to specify a lithium-ion accumulator in which the thermal loading is reduced in the case of an internal short circuit and in the case of a rapid discharge which is necessary to limit damage.

According to the invention, the at least two sub-cells are connected electrically in parallel in the normal operating mode, and in the case of a fault, in particular in the case of an internal short-circuit in at least one defective sub-cell, at least one defective sub-cell can be electrically disconnected from the at least one intact sub-cell.

Owing to the inventive configuration of the cell coil, if rapid discharge of a sub-cell becomes necessary—e.g. owing to a detected fault—and if uncontrolled discharging occurs e.g. owing to an internal cell short-circuit in a sub-cell or the like—the at least one remaining intact sub-cell can be quickly electrically disconnected. The intact sub-cell functions as a heat sink for the ohmic dissipated heat which is released during the rapid discharge, and contributes to the damage limitation. Moreover, the entire capability of the lithium-ion accumulator to conduct away current is available to the defective sub-cell, with the result that relatively high discharge current rates are possible, depending on its electrical design. In addition, if appropriate a defective sub-cell can be selectively disconnected from the other, still intact sub-cells. The electrical disconnection of faulty sub-cells from the remaining, still functionally capable sub-cells is carried out using a suitable open-loop and/or closed-loop control device which is preferably an electronic monitoring device or the like which is designed to perform rapid and selective electrical disconnection of defective sub-cells of the lithium ion accumulator. The disconnection itself can be carried out e.g. electromechanically by means of a relay or electrically in order to bring about the galvanic isolation without disconnecting the potential using power semiconductors. The cell coil for use in a lithium-ion accumulator can basically have more than two wound sub-cells.

In this context, the release of heat in the event of a fault is limited to a non-critical quantity of heat and, in particular, a chain reaction, in the case of which further internal short circuits and other exothermic reactions could be triggered by the released heat, is prevented.

In a further advantageous refinement of the concept on which the invention is based, each sub-cell has a cathode which is coated at least partially with a first active material and an anode which is coated at least partially with a second active material, and a separation layer runs between the first and the second active materials. The cell coil therefore has a plurality of anodes and a plurality of cathodes. As a result, each sub-cell constitutes per se an independent electromechanical element of the lithium-ion accumulator which is constructed from them.

In a further advantageous refinement of the proposed solution according to the invention, the cathode and/or the anode of at least one sub-cell are provided with an insulating layer which electrically insulates the sub-cells from one another. As a result, internal short-circuits between the web-shaped sub-cells in the wound state are reliably prevented.

In one embodiment the at least two sub-cells are wound in an essentially serpentine shape in order to form a prismatic shape of the cell coil. This provides largely cavity-free and therefore space-saving integration of the cell coil into a cuboid housing shape of a lithium-ion accumulator.

In the case of a further embodiment, the at least two sub-cells are wound in an essentially helical shape in order to form a cylindrical shape of the cell coil. This results in an alternative shape of the cell coil in order to implement lithium-ion accumulators with other housing shapes.

In a further advantageous refinement, the cell coil has an inner winding and an outer winding which surrounds the latter, wherein the inner winding and the outer winding are each formed with a wound sub-cell. As a result, production means which are already present for winding lithium-ion accumulators can be used to manufacture the cell coils according to the invention without substantial modifications.

In the case of a further embodiment, at least one further outer winding which contains a further sub-cell is wound onto the outer winding. As a result, an increase in the capacity is possible in this embodiment of the cell coil.

In the case of a technically favorable development, in each case an electrically insulating separation layer is provided between the inner winding and the outer winding and/or between the at least two outer windings. This provides reliable electrical insulation between the inner winding and the outer winding in addition to the insulating layers of the sub-cells.

The separation layer can have an increased level of robustness against mechanical and thermal damage. Likewise, the separation layer can have lower thermal conductivity than the separation layer. As a result, the probability of a defect propagating to an adjacent sub-cell is minimized. If the separation layer is provided only between the sub-cells, increased costs and an increased space requirement are minimized by the additional robustness.

In the continuation of the inventive concept, each sub-cell has in the unwound state an essentially web-shaped form with a width B. As a result, the cell coil can be implemented easily in terms of fabrication technology by winding the sub-cells which are preferably present as web-shaped semi-finished products and which each comprise an anode, cathode and separation layer.

In order to fabricate a cell coil with an inner winding and an outer winding, the inner winding is firstly wound from the semi-finished product. Then, the semi-finished product is cut and the separation layer is applied to the inner winding. Subsequently, the semi-finished product is wound further to form the outer winding. As a result, necessary changes to existing fabrication systems and known fabrication processes to fabricate conventional cell coils are minimized.

The cathode and the anode of each sub-cell advantageously have, for the formation of electrical contact, preferably at least one cathode lug and one anode lug lying opposite one another, wherein the at least one cathode lug and the at least one anode lug each project beyond, in each case, one of the two longitudinal edges of the sub-cell by a width b, transversely with respect to a longitudinal axis of the sub-cell. As a result, the cathode lugs and anode lugs can be formed in terms of fabrication technology as trapezoidal protrusions on both sides of the cathode or of the anode.

Continuing the inventive concept further, at least two cathode lugs and at least two anode lugs are formed axially offset with respect to one another by a distance L on each longitudinal edge of the sub-cell. As a result, in order to ensure a sufficiently high current-carrying capability of the electrical contact-forming means, a multiplicity of cathode lugs or anode lugs which are located one on top of the other are available. The cathode lugs and the anode lugs of various sub-cells are electrically disconnected from one another here.

In accordance with one favorable refinement there is provision that the distance L is varied in each case such that in the wound state of each sub-cell the cathode lugs and the anode lugs, which belong to the same sub-cell, lie essentially congruently one on top of the other in order to form in each case a cathode contact and an anode contact. As a result, inter alia, the increasing radius of the cell coil can be compensated when winding the sub-cells.

BRIEF DESCRIPTION OF THE DRAWINGS

The invention will be described in more detail below with reference to the drawing, in which.

DETAILED DESCRIPTION

Figure 1:
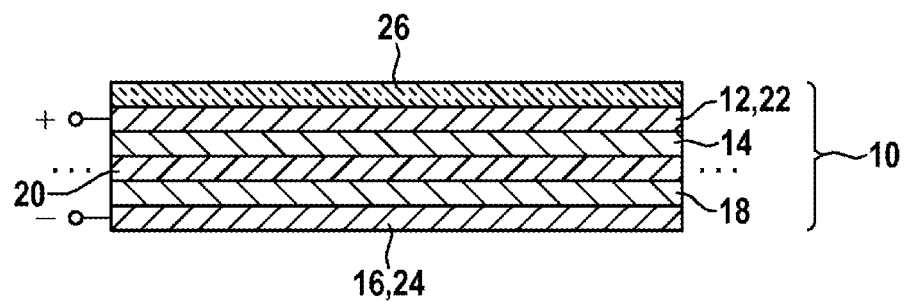
FIG. 1 shows a schematic cross section through a sub-cell having an insulating layer.

FIG. 1 shows a schematic cross section through a sub-cell 10 for use in a cell coil 30, 40, 50, 60, 100, 200 according to the invention for a lithium-ion accumulator (not illustrated in the drawings).

The sub-cell 10 comprises a cathode 12 which is provided with a first electrochemical active material 14, and a cathode 16 which is at least partially coated with a second electrochemical active material 18. The two active materials 14, 18 which run parallel one on top of the other in the unrolled or non-rolled state of the sub-cell 10 are disconnected from one another by a separation layer 20 made of micro-porous polyethylene and/or polypropylene. The cathode 12 and the anode 16 each form a first and a second current conductor 22, 24 for feeding current to the sub-cell 10. For example, the cathode 12 is provided here with an insulating layer 26 in order to avoid intercellular short-circuits during the winding of the sub-cell 10. The insulating layer 26 can, however, also be provided in the region of the anode 16 and in the region of the cathode 12 and the anode 16. The insulating layer 26 can be embodied here as a fixed component of the sub-cell 10 or can be positioned on the layered structure composed of the cathode 12 with the first active material 14, the separation layer 20 and the anode 16 with the second active material 18. The active materials 14, 18 can have a material composition of the same or of different substances, while the cathode 12 is formed with aluminum, and the anode 16 with copper. The unrolled, web-shaped sub-cell 10 here is preferably held in reserve as an "endless" semi-finished product in the form of a roll and can easily be processed to form cell coils 30, 40, 50, 60, 100, 200 with a wide variety of different shapes by winding or rolling.

Basically, any desired number of sub-cells 10 whose layered structure respectively corresponds to the structure of the sub-cell 10 described above can be stacked one on top of the other to form a structure which comprises a plurality of sub-cells 10.

Figure 2:
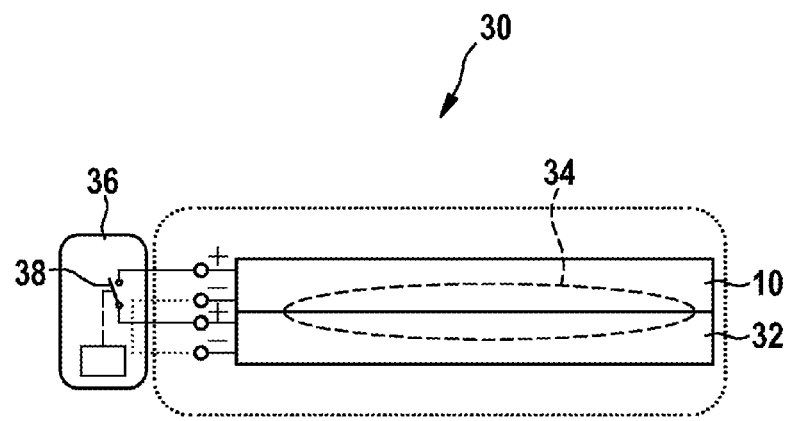
FIG. 2 shows a basic illustration of an embodiment of a cell coil having two sub-cells and a monitoring device.

FIG. 2 shows a basic illustration of a cell coil 30 with two sub-cells 10, 32 as well as with a monitoring device 36.

A cell coil 30 is formed with the sub-cell 10 in FIG. 1 and with a further sub-cell 32 which is of the same design, wherein an inner thermal coupling 34 is present between the sub-cells 10, 32 which lie one on top of the other. The two sub-cells 10, 32 are connected electrically in parallel in a "normal operating mode" of the cell coil 30. In "the case of a fault" such as e.g. a short circuit in one of the two sub-cells 10, 32, these can be electrically disconnected by means of a preferably electronic monitoring device 36. The electrical disconnection can be carried out e.g. with a switch 38 which is embodied as a normally closed switch and which can be actuated by means of the monitoring device 36. The switch 38 can be implemented with an electromechanical relay or with suitable power semiconductors, wherein in the latter case no galvanic or potential-free disconnection of the sub-cells 10, 32 is possible.

Figure 3:
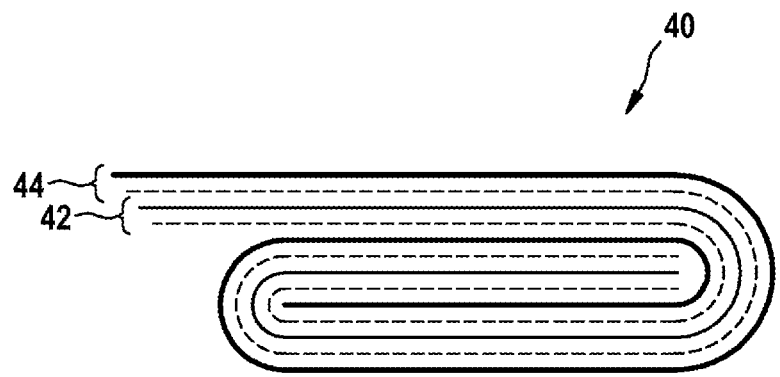
FIG. 3 shows an embodiment of a cell coil having a prismatic shape.

FIG. 3 shows an embodiment of a cell coil 40 with a prismatic shape.

In order to construct a prismatic shape, a cell coil 40 is formed with a first and a second sub-cell 42, 44 which lie one on top of the other and are wound one into the other in an approximately serpentine shape. The structural design of the sub-cells 42, 44 corresponds in each case to that of the sub-cell 10 described in FIG. 1. The prismatic cell coil 40 is preferably provided with a cuboid housing for use for a lithium-ion accumulator. In contrast with the two sub-cells 42, 44 which are merely shown here by way of example, the cell coil 40 can also have three or more sub-cells 10, 42, 44. According to the invention, the two sub-cells 42, 44 of the cell coil 40 can be electrically disconnected from one another by means of the monitoring device 36 in FIG. 2.

In the "normal operating mode" of the cell coil 40, the two sub-cells 42, 44 are connected in parallel in order to ensure, in particular, uniform charging. In the "event of a fault" of the cell coil 40, which fault is present e.g. in the event of an internal short circuit in the sub-cell 42, the defective sub-cell 42 is immediately electrically disconnected from the still intact sub-cell 44 by means of the monitoring device 36. This electrical disconnection or switching off is carried out by means of the preferably electronic monitoring device 36 (illustrated schematically in FIG. 2) by means of a relay or using suitable power semiconductors. As a result of the electrical disconnection which takes place approximately in real time, the intact sub-cell 44 additionally functions as a heat sink for ohmic dissipated heat which is released during the rapid discharging of the defective sub-cell 42 which is generally initiated in order to limit damage in the case of a short circuit, wherein at the same time the full current-carrying capacity of the cell coil 40 can be utilized for the rapid discharging process, with the result that shortening of the rapid discharging time can be achieved.

Figure 4:
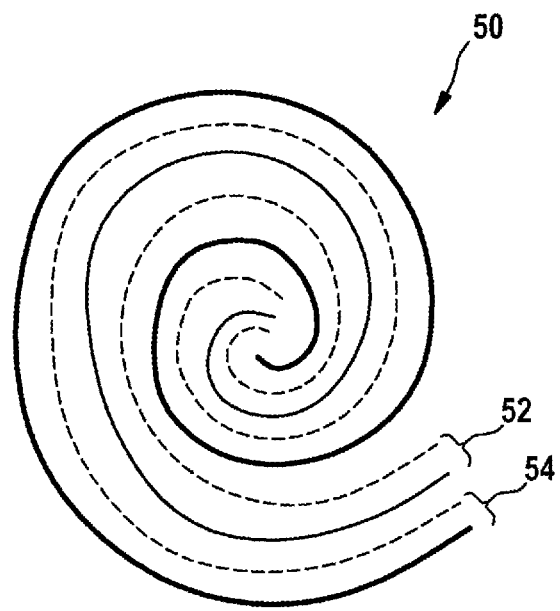
FIG. 4 shows an embodiment of a cell coil having a cylindrical shape.

FIG. 4 illustrates a further embodiment of a cell coil 50 with a cylindrical shape.

In order to construct a cylindrical shape, a cell coil 50 is formed with two sub-cells 52, 54 which lie one on top of the other and are wound approximately in a helical shape and whose structural design corresponds in turn in each case to the sub-cell 10 already explained in FIG. 1. The cell coil 50 is predominantly suitable for lithium-ion accumulators whose housing has a non-polygonal shape which deviates from the cuboid shape. In contrast to the first and second sub-cells 52, 54 which are merely exemplary here, the cell coil 50 can also have three or more sub-cells 10, 52, 54.

Figure 5:
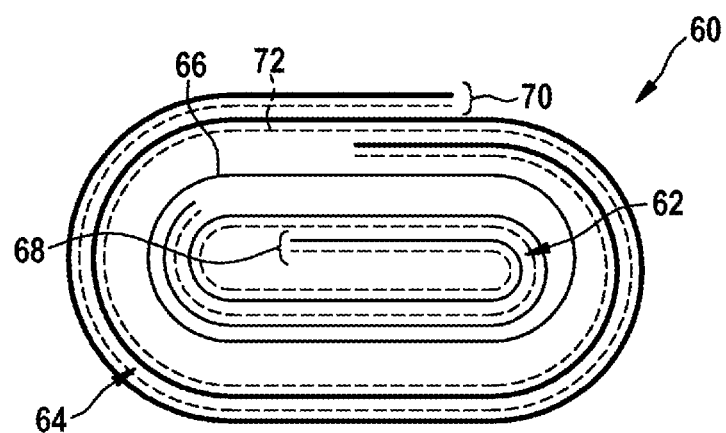
FIG. 5 shows an embodiment of a cell coil having an inner winding and an outer winding surrounding the latter coaxially.

FIG. 5 illustrates a further embodiment of a cell coil 60 with an inner winding 62 and an outer winding 64 which surrounds the latter coaxially.

A cell coil 60 is formed with an inner winding 62 and an outer winding 64 which surrounds the latter coaxially, wherein an electrically insulating separation layer 66 is provided between the inner winding 62 and the outer winding 64. The inner winding 62 is formed with a wound first sub-cell 68 and the outer winding 64 is formed with a rolled second sub-cell 70. The rolled sub-cells 68, 70 each lie one on top of the other or against one another in the inner winding 62 and in the outer winding 64.

The separation layer 66 functions, in particular not only as an insulating layer 72 of the outer second sub-cell 70 but also as an additional electrical insulating means between the inner winding 62 and the outer winding 64. Where necessary, at least one further outer winding 64 can be wound onto the illustrated outer winding 64 with the intermediate positioning of a further separation layer 66.

Figure 6:
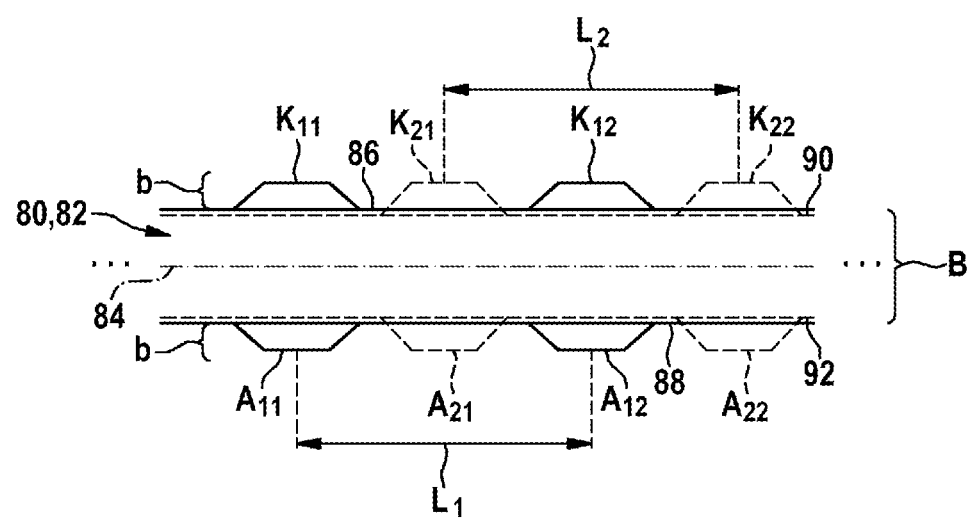
FIG. 6 shows a schematic plan view of two unrolled web-shaped sub-cells which lie one on top of the other and have cathode lugs and anode lugs for the electrical connection.

FIG. 6 illustrates a schematic plan view of two unrolled web-shaped sub-cells 80, 82 which lie one on top of the other and have cathode lugs $K_{11}$, $K_{12}$, $K_{21}$, $K_{22}$ and anode lugs $A_{11}$, $A_{12}$, $A_{21}$, $A_{22}$ for electrical connection.

The two unrolled web-shaped or strip-shaped sub-cells 80, 82 which lie one on top of the other have in each case a width B over their common longitudinal axis 84 here. The layered structure of the two sub-cells 80, 82 corresponds in turn to the structural configuration of the sub-cell 10 which is already explained in FIG. 1.

On a first longitudinal edge 86 of the first sub-cell 80, for example two e.g. trapezoidal cathode lugs $K_{11}$ and $K_{12}$ are formed here as integral components of the metallic cathode 12 (not illustrated here in detail for sake of better clarity of the drawing) or of the first current conductor 22 of the first sub-cell 80 in each case transversely with respect to the longitudinal axis 84. Correspondingly, on a second longitudinal edge 88 of the first sub-cell 80 in each case two anode lugs $A_{11}$ and $A_{12}$ are constructed lying opposite the cathode lugs $K_{11}$ and $K_{12}$ or in a mirror-inverted fashion with respect to the longitudinal axis 84. The cathode lugs $K_{11}$ and $K_{12}$ as well as the anode lugs $A_{11}$ and $A_{12}$ each project beyond the longitudinal edges 86, 88 of the first sub-cell 80 by a width b, transversely with respect to the longitudinal axis 84. Between the cathode lugs $K_{11}$ and $K_{12}$ as well as between the anode lugs $A_{11}$ and $A_{12}$ there is, related in each case to their center in the axial direction, an axial distance of $L_1$. The first sub-cell 80 has a multiplicity of cathode lugs $K_{11}$ and $K_{12}$ and anode lugs $A_{11}$, $A_{12}$ (not shown here) which are constructed in accordance with the cathode lugs $K_{11}$, $K_{12}$ and the anode lugs $A_{11}$, $A_{12}$ and the distances $L_1$ between which vary in each case in such a way that the cathode lugs $K_{11}$, $K_{12}$ and the anode lugs $A_{11}$, $A_{12}$ lie, in the wound state of the first sub-cell 80, ideally in each case in a congruent fashion one on top of the other on the circumferential side in order to provide sufficiently mechanically stable and current-carrying-capable cathode contacts 102 and anode contacts (cf. FIGS. 7 and 8) for the formation of electrical contact or for the connection of the cell coil 100, 200.

Correspondingly, a multiplicity of correspondingly configured cathode lugs $K_{21}$, $K_{22}$ and anode lugs $A_{21}$, $A_{22}$ are formed on both longitudinal edges 90, 92 of the second sub-cell 82, of which cathode lugs and anode lugs in each case only two cathode lugs $K_{21}$, $K_{22}$ and anode lugs $A_{21}$, $A_{22}$ are indicated with dashed lines in a way which is representative of all the others. Between the cathode lugs $K_{21}$, $K_{22}$ and the anode lugs $A_{21}$, $A_{22}$ there is a distance of $L_2$. The distances $L_2$ between the individual cathode lugs $K_{21}$, $K_{22}$ and anode lugs $A_{11}$, $A_{12}$ vary along the longitudinal extent of the second sub-cell 82, in particular as a function of the coil geometry, e.g. helical or serpentine, used, such that the cathode lugs $K_{21}$, $K_{22}$ and anode lugs $A_{21}$, $A_{22}$ in the wound state of the second sub-cell 82 ideally lie one on top of the other or lie one against the other again in a congruent fashion.

Figure 7:
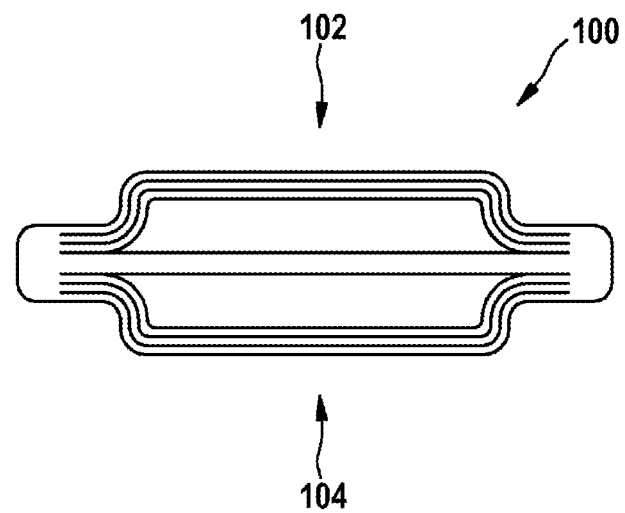
FIG. 7 shows a basic plan view of a cell coil having two sub-cells.

FIG. 7 shows a highly simplified plan view of a prismatic cell coil 100 with two sub-cells 10, 32, 42, 44, 52, 54, 68, 70, 80, 82 which can be electrically disconnected from one another by means of the monitoring device 36.

An exemplary, in turn prismatic, cell coil 100 has on both sides a multiplicity of cathode lugs $K_{11}$, $K_{12}$, $K_{21}$, $K_{22}$ and anode lugs $A_{11}$, $A_{12}$, $A_{21}$, $A_{22}$ which are not denoted individually and which together form the two upper-side cathode contacts 102, 104 which can be seen here, while two anode contacts lying at the bottom cannot be seen in the illustration in FIG. 6. The first and the second sub-cells 10, 32, 42, 44, 52, 54, 68, 70, 80, 82 of the cell coil 100 are electrically connected independently of one another and actuated via the total of four cathode contacts 102, 104 and anode contacts, wherein the sub-cells 10, 32, 42, 44, 52, 54, 68, 70, 80, 82 are continuously automatically monitored in the "normal operating mode" of the cell coil 100 by means of the automatic monitoring device 36, and in "the event of a fault" can be electrically disconnected from one another immediately by means of said monitoring device 36.

Figure 8:
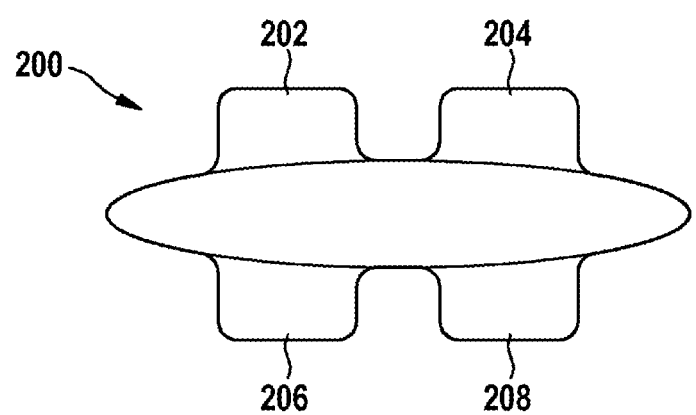
FIG. 8 shows a basic plan view of an embodiment of a cell coil having four sub-cells.

FIG. 8 shows a basic plan view of an embodiment of a cell coil 200 with four sub-cells 10, 32, 42, 44, 52, 54, 68, 70, 80, 82.

The cell coil 200 is constructed here by way of example with four sub-cells 10, 32, 42, 44, 52, 54, 68, 70, 80, 82, the cathode lugs $K_{11}$, $K_{12}$, $K_{21}$, $K_{22}$ and anode lugs $A_{11}$, $A_{12}$, $A_{21}$, $A_{22}$ of which are combined to form four upper-side cathode contacts 202, 204, 206 and 208 which can be seen here, while four lower-side anode contacts are in turn concealed or not visible here.

The invention claimed is:

1. A cell coil (30, 40, 50, 60, 100, 200) for a lithium ion accumulator having at least two sub-cells (10, 32, 42, 44, 52, 54, 68, 70, 80, 82) which are wound in a space-saving fashion and thermally coupled to one another, characterized in that the at least two sub-cells (10, 32, 42, 44, 52, 54, 68, 70, 80, 82) are connected electrically in parallel in a normal operating mode, and in the case of a fault, at least one defective sub-cell (10, 32, 42, 44, 52, 54, 68, 70, 80, 82) configured to be electrically disconnected from an at least one intact sub-cell (10, 32, 42, 44, 52, 54, 68, 70, 80, 82), characterized in that the cell coil (60) has an inner winding (62) that is formed with a first sub-cell (68) wound around itself, a separation layer positioned around the inner winding (62), the entire separation layer outside of the inner winding, and an outer winding (64) that is formed with a second sub-cell (70) wound completely around the separation layer, the entire outer winding outside of the separation layer, the separation layer separating the outer winding from the inner winding.

2. The cell coil (30, 40, 50, 60, 100, 200) as claimed in claim 1, characterized in that each sub-cell (10, 32, 42, 44, 52, 54, 68, 70, 80, 82) has a cathode (12) which is coated at least partially with a first active material (14) and an anode (16) which is coated at least partially with a second active material (18), and a separation layer (20) runs between the first and the second active materials (14, 18).

3. The cell coil (30, 40, 50, 60, 100, 200) as claimed in claim 2, characterized in that the cathode (12) and/or the anode (16) of at least one sub-cell (10, 32, 42, 44, 52, 54, 68, 70, 80, 82) are provided with an insulating layer (26, 72) which disconnects the sub-cell (10, 32, 42, 44, 52, 54, 68, 70, 80, 82) from at least one further sub-cell (10, 32, 42, 44, 52, 54, 68, 70, 80, 82).

4. The cell coil (40) as claimed in claim 1, characterized in that the at least two sub-cells (42, 44) are wound in an essentially serpentine shape in order to form a prismatic shape of the cell coil (40).

5. The cell coil (50) as claimed in claim 1, characterized in that the at least two sub-cells (52, 54) are wound in an essentially helical shape in order to form a cylindrical shape of the cell coil (50).

6. The cell coil (60) as claimed in claim 4, characterized in that in each case an electrically and/or mechanically and/or thermally insulating separation layer (66) is provided between at least two sub-cells (52, 54).

7. The cell coil (60) as claimed in claim 1, characterized in that at least one further outer winding (64) which contains a further sub-cell (68, 70) is wound onto the outer winding (64).

8. The cell coil (60) as claimed in claim 1, characterized in that the separation layer is an electrically and/or mechanically and/or thermally insulating separation layer (66).

9. The cell coil (30, 40, 50, 60, 100, 200) as claimed in claim 1, characterized in that each sub-cell (10, 32, 42, 44, 52, 54, 68, 70, 80, 82) has in an unwound state an essentially web-shaped form with a width (B).

10. The cell coil (30, 40, 50, 60, 100, 200) as claimed in claim 1, characterized in that the cathode (12) and the anode (16) of each sub-cell (10, 32, 42, 44, 52, 54, 68, 70, 80, 82) have, for the formation of electrical contact, at least one cathode lug ($K_{11}$, $K_{12}$, $K_{21}$, $K_{22}$) and one anode lug ($A_{11}$, $A_{12}$, $A_{21}$, $A_{22}$) lying opposite one another, wherein the at least one cathode lug ($K_{11}$, $K_{12}$, $K_{21}$, $K_{22}$) and the at least one anode lug ($A_{11}$, $A_{12}$, $A_{21}$, $A_{22}$) each project beyond, in each case, one of the two longitudinal edges (86, 88, 90, 92) of the sub-cell (10, 32, 42, 44, 52, 54, 68, 70, 80, 82) by a width (b), transversely with respect to a longitudinal axis (84) of the sub-cell (10, 32, 42, 44, 52, 54, 68, 70, 80, 82).

11. The cell coil (30, 40, 50, 60, 100, 200) as claimed in claim 10, characterized in that at least two cathode lugs ($K_{11}$, $K_{12}$, $K_{21}$, $K_{22}$) and at least two anode lugs ($A_{11}$, $A_{12}$, $A_{21}$, $A_{22}$) are formed axially offset with respect to one another by a distance ($L_1$, $L_2$) on each longitudinal edge (86, 88, 90, 92) of the sub-cell (10, 32, 42, 44, 52, 54, 68, 70, 80, 82).

12. The cell coil (30, 40, 50, 60, 100, 200) as claimed in claim 11, characterized in that the distance ($L_1$, $L_2$) is varied in each case such that in the wound state of each sub-cell (10, 32, 42, 44, 52, 54, 68, 70, 80, 82) the cathode lugs ($K_{11}$, $K_{12}$, $K_{21}$, $K_{22}$) and the anode lugs ($A_{11}$, $A_{12}$, $A_{21}$, $A_{22}$) lie essentially congruently one on top of the other in order to form a cathode contact (102, 104, 202, 204, 206, 208) and an anode contact.

13. The cell coil (30, 40, 50, 60, 100, 200) as claimed in claim 1, wherein the at least two sub-cells (10, 32, 42, 44, 52, 54, 68, 70, 80, 82) are connected electrically in parallel in the normal operating mode, and in the case of an internal short-circuit in at least one defective sub-cell (10, 32, 42, 44, 52, 54, 68, 70, 80, 82), at least one defective sub-cell (10, 32, 42, 44, 52, 54, 68, 70, 80, 82) configured to be electrically disconnected from the at least one intact sub-cell (10, 32, 42, 44, 52, 54, 68, 70, 80, 82).

14. The cell coil as claimed in claim 1, wherein the defective sub-cell can be separated by an electronic monitoring device or a control device.

\* \* \* \* \*